April 14, 1964   E. W. BAXTER   3,128,919
LIQUID MEASURING AND DISPENSING DEVICE
Filed May 31, 1961
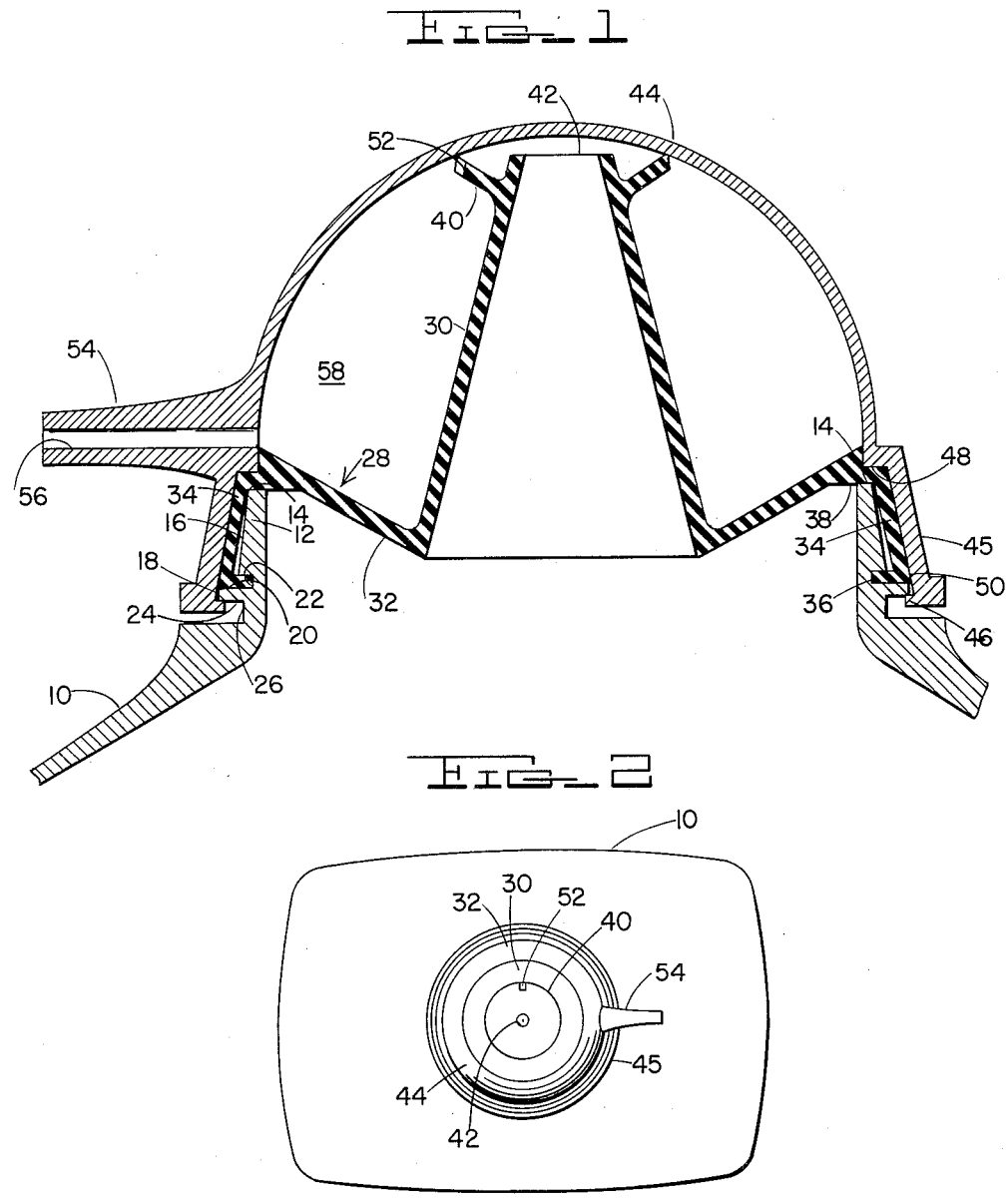
INVENTOR.
ERNEST W. BAXTER
BY Bust & Irish
ATTORNEYS United States Patent Office 3,128,919
Patented Apr. 14, 1964

3,128,919
LIQUID MEASURING AND DISPENSING DEVICE
Ernest W. Baxter, Van Wert, Ohio, assignor to Baxter Products Company, Van Wert, Ohio
Filed May 31, 1961, Ser. No. 113,850
2 Claims. (Cl. 222—207)

The present invention relates to a liquid measuring and dispensing device and more particularly to new and useful improvements in a dispenser which may be attached to a container for measuring and dispensing predetermined quantities of liquid material from the container.

Household detergents are conventionally packaged in a plastic or the like bottle or container, these bottles and containers being deformable to such an extent that the liquid contents therein may be forcefully expelled. Such a container, in some instances, is equipped with a measuring cap which, when it is desired to dispense a quantity of detergent from the container, is first removed and thereafter used as a measuring cup. In many instances, the user either is not aware of the fact that the cap is to be used as a measuring cup or does not wish to take the time and trouble to so use it. In any event, when the cap is not so used, improper amounts of detergent are oftentimes dispensed. In the event too little detergent is used, proper cleaning action is not obtained, and, on the other hand, when too much is used, the resulting composition becomes an irritant to the user's hands.

With the foregoing in mind, it is an object of this invention to provide a liquid measuring and dispensing device for a container whereby precise amounts of liquid may be measured from the container and thereafter dispensed into a suitable vessel.

It is still another object of this invention to provide a liquid measuring and dispensing device which may be removably attached to a container and thereafter used to dispense precise quantities of liquid.

It is yet another object of this invention to provide such a device wherein any residual liquid will not accidentally drain therefrom but will be collected in the device itself.

It is another object of this invention to provide such a device wherein quantities of liquid may be measured into a measuring chamber by inverting the container and forcing a portion of the liquid contents into the chamber, and thereafter righting the container and expelling the contents from the chamber by forcefully deforming the latter.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a cross-sectional illustration of one embodiment of this invention; and FIG. 2 is a top plan view thereof.

Referring to the drawings, a deformable container 10 which may be made of a suitably flexible plastic material is provided with the usual spout or neck 12. The outer end 14 of this spout 12 is annular in shape and preferably flat as shown. The outer periphery 16 of the spout is tapered downwardly and outwardly as shown for a purpose which will become apparent from the following description.

Located at a point spaced from the outer end 14 is an annular projection 18 which extends outwardly radially from the periphery 16. Adjacent to the upper surface 20 of this annular projection 18 is an annular groove 22, and adjacent to the lower surface 24 is another somewhat wider annular groove 26.

The open end of the neck 12 is covered by a closure device 28 which is preferably made of rubber or a similarly suitable flexible material. This closure device 28 comprises a frusto-conically shaped spout member 30 and a partition 32. The partition 32 is annular in shape and is secured or joined at its inner periphery to the lower end of the spout member 30. The peripherally outer portion of the partition 32 is provided with a downwardly extending sleeve 34, this sleeve 34 having a radially inwardly projecting flange 36 on the lower end thereof. This flange 36 is received by the annular groove 22 and seats snugly and seals against the bottom thereof as shown.

At the place where the sleeve 34 joins the outer perimeter of which the partition 32 is provided an annular sealing portion 38 which sealingly engages the outer end 14 of the neck 12. The purpose of this will become apparent as the description proceeds.

On the upper end of the spout member 30 is provided an annular check valve 40, this check valve 40 projecting annularly outwardly and upwardly as shown for a purpose which will be explained more fully hereinafter. The upper end 42 of spout member 30 terminates just short of a dome member 44 which will be explained in more detail.

The dome member 44 is preferably hemispherical in shape with a skirt 45 being connected to or otherwise formed integrally with the dome member 44 as shown. The skirt 45 extends axially of the neck 12 and completely surrounds the sleeve portion 34 of the closure device 28. As a matter of fact, the skirt 45 has on its lower extremity a radially inwardly directed flange 46 which snaps under and engages the lower surface 24 of the annular projection 18.

At the juncture of the skirt 45 with the open end edge of the dome member edge 44 is formed an annular seat or shoulder 48. This shoulder 48 is juxtaposed with respect to and spaced from the outer end 14 of the neck 12 so as to receive therebetween the annular sealing portion 38 of the closure device 28. The sealing portion 38 is so dimensioned as to be sealingly clamped between the annular shoulder 48 and the outer end 14. By this means, liquid is prevented from escaping past the outer end 14 and the shoulder 48. The dome member 44 is clamped onto the neck 12 by virtue of the forceful engagement of the flange 46 with the projection 18 whereby the shoulder 48 is urged against the sealing portion 38.

An additional seal is provided by means of the skirt 45 by its being preformed to engage snugly the sleeve 34 in the region 50 directly opposite the flange 36. This snug engagement forces the flange 36 against the bottom of its companion groove 22 and thereby prevents the escape of any liquid past any of the parts 12, 34 and 45.

The check valve 40 is preformed to just touch and seal against the inner wall of the dome member 44 as shown. Preferably, the check valve 40 is provided with a small slot or aperture 52 for a purpose which will be explained more fully hereinafter.

A nozzle 54 is integrally attached to the dome member 44 and is provided with an outlet passage 56 which communicates with the interior of the dome member 44. This nozzle 54 and its passage 56 are located near the base of the dome member 44 and immediately adjacent to the upper surface of the partition 32.

As will be noted from careful examination of FIG. 1, the partition 32 angles downwardly and away from the outer end 14 of the neck 12 and also the passage 56 of the nozzle 54. The reason for this will be explained more fully in the following.

In some instances, it is preferred that the dome member 44 be fabricated of transparent plastic. However, as the description proceeds it will be apparent that the material need not be transparent but that a degree of translucency will be adequate.

In operation, when it is desired to dispense a measured quantity of liquid, the container 10 is inverted so that the device of FIG. 1 hangs downwardly. The container 10 is gently squeezed, forcing liquid downwardly through the spout member 30 past the check valve 40 and into the chamber 58 which is bounded by the inner wall of the dome member 44 and the outer surfaces of the closure device 28. Once the chamber 58, in this inverted position, is completely filled, the container 10 is turned upright and the nozzle 54 is aimed toward the vessel or in the direction in which it is desired to dispense the liquid. The container 10 is again gently squeezed or deformed, thereby displacing air which in turn pushes or forces the liquid in the chamber 58 out of the nozzle 54. Once the contents of the chamber 58 have been exhausted, the container 10 is released so that the walls thereof will distend to their natural shape. In order for this to occur, it is necessary that air pass backwardly through the nozzle 54 and into the container, and this is permitted by means of the aperture 52 in the check valve 40.

Any residual liquid in the chamber 58 which adheres to the walls of the dome member 44 and the closure device 28 will not leak or drip from the nozzle 54 but instead will drain downwardly onto the partition 32 in the region adjacent to the spout member 30. By this means, the nozzle 54 will never drip any of the residual liquid.

Since the volume of the chamber 58 is fixed by the design, the same quantities of liquid may be dispensed with each and every operation as just explained. As will now be evident, this measuring and dispensing operation is indeed simple to achieve, even the most unskilled person obtaining the same, precise quantity of liquid with each operation thereof. Furthermore, by reason of the check valve 40, the mechanism of FIG. 1 as described in the foregoing may serve as the natural closure for the container 10, thereby removing the necessity of applying or removing any kind of a cap to or from the container 10.

While I have described above the principles of my invention in connection with specific apparatus, it is to be clearly understood that this description is made only by way of example and not as a limitation to the scope of my invention.

What is claimed is:

1. A liquid measuring and dispensing device comprising a flexible container having a pouring spout composed of an annular neck portion, said neck portion being tubular in shape and having an annular outer end, an outwardly extending annular projection on the outer peripheral surface of said neck portion, said projection having upper and lower surfaces, two annular grooves in said neck portion on opposite sides of said projection respectively, a rubber closure device comprising a tapered spout member and a partition, said tapered spout member having upper and lower ends at the smaller and larger diameter portions respectively, said partition being annular in shape and being joined at its inner perimeter to said lower end, the upper end of said tapered spout member having an outwardly extending annular shaped check valve thereon, said check valve being formed integrally with said tapered spout member, an annular sleeve portion joined to the outer perimeter of said partition, said sleeve portion surrounding said neck portion and having an inturned flange on the end thereof which engages the upper surface of said projection and the adjacent one of said two annular grooves, said sleeve portion also having an annular sealing portion which engages the outer end of said neck portion, said partition angling downwardly from said outer end to the location of joinder to said tapered spout member, a dome member of hemispherical shape having an annular skirt on the perimetral edge thereof, said skirt surrounding and intimately engaging said sleeve portion, an inwardly projecting annular flange on the outer end of said skirt engageable with the lower surface of said annular projection, said dome member having an annular shoulder on the inner wall thereof which is juxtaposed with respect to the annular outer end of said neck portion, said annular sealing portion of said partition being sealingly clamped between said annular outer end and said annular shoulder to prevent the escape of liquid, the outer perimeter of said check valve sealingly engaging the upper inner wall of said dome member, an aperture in said check valve, and a nozzle on said dome member adjacent to said partition whereby liquid inside said dome member may be dispensed.

2. A liquid measuring and dispensing device comprising a flexible container having a pouring spout composed of an annular neck portion, said neck portion being tubular in shape and having an annular outer end, an outwardly extending annular projection on the outer peripheral surface of said neck portion, said projection having upper and lower surfaces, a rubber closure device comprising a tapered spout member and a partition, said tapered spout member having upper and lower ends at the smaller and larger diameter portions respectively, said partition being annular in shape and being joined at its inner perimeter to said lower end, the upper end of said tapered spout member having an outwardly extending annular shaped check valve thereon, an annular sleeve portion joined to the outer perimeter of said partition, said sleeve portion surrounding said neck portion and having an inturned flange on the end thereof which engages the upper surface of said projection, said sleeve portion also having an annular sealing portion which engages the outer end of said neck portion, a dome member of hemispherical shape having an annular skirt on the perimetral edge thereof, said skirt surrounding and intimately engaging said sleeve portion, an inwardly projecting annular flange on the outer end of said skirt engageable with the lower surface of said annular projection, said dome member having an annular shoulder on the inner wall thereof which is juxtaposed with respect to the annular outer end of said neck portion, said annular sealing portion of said partition being sealingly clamped between said annular outer end and said annular shoulder to prevent the escape of liquid, the outer perimeter of said check valve sealingly engaging the upper inner wall of said dome member, and a nozzle on said dome member adjacent to said partition whereby liquid inside said dome member may be dispensed.

References Cited in the file of this patent

UNITED STATES PATENTS

| | | |
|---|---|---|
| 2,143,661 | Schrader | Jan. 10, 1939 |
| 2,475,720 | Preston | July 12, 1949 |
| 2,512,813 | Sodders | June 27, 1950 |
| 2,609,970 | Blumson | Sept. 9, 1952 |
| 2,989,216 | Moro-lin | June 20, 1961 |